United States Patent

Tsuyama

[11] Patent Number: 4,896,065
[45] Date of Patent: Jan. 23, 1990

[54] MINIATURE MOTOR

[75] Inventor: Kenji Tsuyama, Chiba, Japan

[73] Assignee: Mabuchi Motor Co., Ltd., Chiba, Japan

[21] Appl. No.: 1,371

[22] Filed: Jan. 8, 1987

[30] Foreign Application Priority Data

Sep. 1, 1986 [JP] Japan ................. 61-1271[U]

[51] Int. Cl.$^4$ ............................................ H02K 21/26
[52] U.S. Cl. ............................ 310/154; 310/40 MM; 310/51; 310/90; 310/191; 310/254
[58] Field of Search .............. 310/40 MM, 89, 80, 90, 310/81, 154, 82, 51, 84, 191, 216, 209, 261, 254, 233, 248, 111; 335/230

[56] References Cited

U.S. PATENT DOCUMENTS

| 2,561,890 | 7/1951 | Stoddard | 310/82 U X |
|---|---|---|---|
| 2,761,079 | 8/1956 | Giertz-Hedstorm | 310/82 |
| 2,999,952 | 9/1961 | Hammes | 310/154 |
| 3,624,574 | 11/1971 | Montagu | 335/279 |
| 4,152,614 | 5/1979 | Noguchi | 310/233 |
| 4,135,119 | 1/1979 | Brosens | 310/25 |
| 4,225,798 | 9/1980 | Barrett | 310/154 |
| 4,237,397 | 12/1980 | Mohr | 310/154 |
| 4,482,828 | 11/1984 | Vergues | 310/80 |
| 4,574,215 | 3/1986 | Mabuchi | 310/248 |
| 4,665,335 | 5/1987 | Schimozono | 310/154 |

FOREIGN PATENT DOCUMENTS

| 1132229 | 6/1962 | Fed. Rep. of Germany | 310/82 |
|---|---|---|---|
| 2003568 | 8/1971 | Fed. Rep. of Germany | 310/154 |
| 2347856 | 4/1975 | Fed. Rep. of Germany | 310/51 |
| 2835507 | 5/1979 | Fed. Rep. of Germany | 310/51 |
| 0162448 | 8/1985 | Japan | 310/40 MM |

Primary Examiner—R. Skudy
Attorney, Agent, or Firm—McGlew & Tuttle

[57] ABSTRACT

A miniature motor comprising a motor case having a bearing on the closed end face thereof, a stator consisting of a permanent magnet, brushes and terminals; and a rotor fixedly fitted to a motor shaft in the motor case and having core windings and a commutator; the rotor being rotatably supported by the bearing; in which the rotor and the stator are adapted so that the balance of magnetic field intensity between the stator and the rotor becomes unbalanced structurally or magnetically, thereby causing the rotor to be biased within the bearing in a predetermined positional direction with respect to the stator.

10 Claims, 1 Drawing Sheet

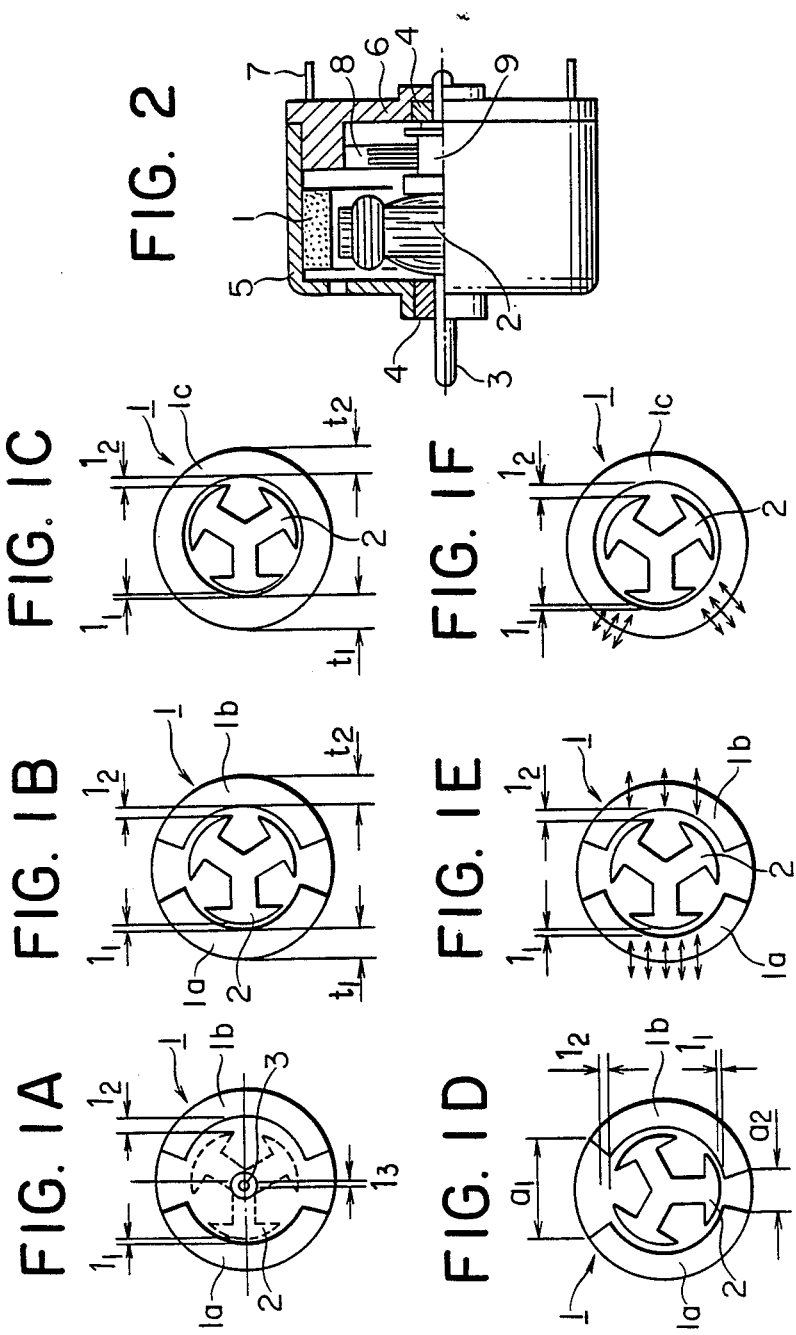

MINIATURE MOTOR

BACKGROUND OF THE INVENTION

This invention relates generally to a miniature motor, and more particularly to a miniature motor in which a rotor is adapted to be biased in a predetermined direction with respect to a stator.

DESCRIPTION OF THE PRIOR ART

In general, bearings for miniature motors are made of oil-impregnated sintered metal and fixedly fitted to a rotor shaft with a clearance. A rotor which is fixedly fitted to the shaft and rotates in the magnetic field of the stator, together with the shaft, is caused to vibrate radially by the attractive force of the magnetic field. As a result, the shaft wobbles within the bearing, producing a rolling noise, which is undesirable for audio equipment and other equipment. As a means to eliminate this unwanted rolling noise, it has been attempted to reduce the clearance between the shaft and the inside diameter of the bearing down to a few microns. This arrangement inevitably involves increased friction and entails a number of other problems such as the seizing of the shaft and the bearing, and the overloading of the motor.

SUMMARY OF THE INVENTION

This invention is intended to overcome the above mentioned problems problems.

It is an object of this invention to provide a miniature motor comprising a motor case having a bearing on the end face thereof, a stator consisting of a permanent magnet, brushes and terminals; and a rotor fixedly fitted to a motor shaft in the motor case and having core windings and a commutator; the rotor being rotatably supported by the bearing; in which the rotor and the stator are adapted so that the balance of magnetic field intensity between the stator and the rotor becomes unbalanced structurally or magnetically, whereby causing the rotor to be biased within the bearing in a predetermined positional direction with respect to the stator.

It is another object of this invention to provide a miniature motor in which a portion of the rotor is adapted to receive the magnetic field from the stator more intensely than at the other portions of the rotor by biasing the shaft in a predetermined direction within the bearing so as to make the magnetic field intensity between the stator and the rotor unbalanced.

It is a further object of this invention to provide a miniature motor in which a portion of the rotor is adapted to receive magnetic field from the stator more intensely than at the other portions by shifting the air gap between the rotor and the stator in a predetermined direction by providing a split type stator having a thicker segment and a thinner segment so as to make the magnetic field intensity between the rotor and the stator unbalanced.

It is still a further object of this invention to provide a miniature motor in which a portion of the rotor is adapted to receive magnetic field form the stator more intensely than at the other portions by shifting the air gap between the rotor and the stator in a predetermined direction by providing a ring-shaped stator having a thicker portion and a thinner portion so as to make the magnetic field intensity between the rotor and the stator unbalanced.

It is still a further object of this invention to provide a miniature motor in which a portion of the rotor is adapted to receive magnetic field from the stator more intensely than at the other portions by producing a difference in the air gap between the rotor and the stator by providing a split-type stator having unbalanced circumferential spatial distances between stator segments so as to make the magnetic field intensity between the stator and the rotor unbalanced.

It is still a further object of this invention to provide a miniature motor in which a portion of the rotor is adapted to receive magnetic field from the stator more intensely than at the other portions by biasing the shaft within the bearing in a predetermined direction by providing a split-type stator having a stator segment with stronger magnetism and a stator segment with weaker magnetism so as to make the magnetic field intensity between the rotor and the stator unbalanced.

It is still a further object of this invention to provide a miniature motor in which a portion of the rotor is adapted to receive magnetic field from the stator more intensely than at the other portions by biasing the shaft within the bearing in a predetermined direction by providing a ring-shaped stator having stronger and weaker magnetism therein so as to make the magnetic field intensity between the rotor and the stator unbalanced.

A further object of the invention is to provide a miniature motor having a motor case, first and second bearings which are supported by the motor case, a stator in the form of a permanent magnet positioned within the motor case, a rotor shaft supported by the first and second bearings and a rotor which is acted on by the magnetic field of the stator. A magnetic biasing means is provided for urging the rotor and the rotor shaft within the bearing in a radial direction during rotation of the rotor and the rotor shaft thereby preventing the rotor and the rotor shaft from vibrating radially within the bearing.

Another object of the invention is to provide a miniature motor having a rotor shaft biasing means which overcomes radial vibrations which is simple in design, rugged in construction and economical to manufacture.

These and other objects and advantages will become more apparent upon a reading of the following description taken in connection with the accompanying drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIGS. 1 (A) through (D) are diagrams of assistance in explaining miniature motors embodying this invention in which the rotor is caused to be biased structurally in a predetermined direction with respect to the stator.

FIGS. 1 (E) and (F) are diagrams of assistance in explaining miniature motors embodying this invention in which the rotor is caused to be biased magnetically in a predetermined direction with respect to the stator.

FIG. 2 is a partially sectional side elevation illustrating a miniature motor embodying this invention.

DETAILED DESCRIPTION OF THE EMBODIMENTS

In FIGS. 1 (A–F) and 2, reference numeral 1 refers to a stator having a permanent magnet field; $1a$ and $1b$ being C-shaped stators and $1c$ being a ring-shaped stator; 2 to a rotor; 3 to a shaft; 4 to a bearing; 5 to a motor case; 6 to a case cover; 7 to a terminal; 8 to a brush; 9 to a commutator; $l_1$, $l_2$ and $l_3$ to different air gaps between the rotor and the stator; $t_1$ and $t_2$ to different thicknesses of the stator; and $a_1$ and $a_2$ to different circumferential spatial distances between stator segments, respectively.

The miniature motor according to this invention has such a construction as shown in FIG. 2. Specific description about general features of the motor has been omitted here because the construction of the miniature motor of this invention is essentially the same as motors of conventional and known types. The rotor 2 is fixedly fitted to the shaft 3 and rotatably supported by the bearings 4 and 4, and rotates within the stator 1, generating an unwanted rolling noise. This invention is intended to eliminate this rolling noise. In the embodiment shown in FIG. 1 (A), the air gap $l_1$ between the C-shaped stator segment $1a$ and the rotor 2 is made smaller than the air gap $l_2$ between the C-shaped stator segment $1b$ and the rotor 2 by shifting the shaft 3 bearings 4 by $l_3$ toward the stator $1a$. This represents an embodiment where the rotor 2, together with the bearing, is biassed structurally. FIG. 1 (B) shows an embodiment where the stator 1 is composed of the C-shaped stator segments $1a$ and $1b$, as in the case of FIG. 1(A); the thickness $t_1$ of the thick C-shaped stator segments $1a$ being different from the thickness $t_2$ of the thin C-shaped stator segment $1b$, thus making the air gap $l_1$ between the C-shaped stator segment $1a$ and the rotor 2 smaller than the air gap $l_2$ between the C-shaped rotor segment $1b$ and the rotor 2. FIG. 1 (C) shows an embodiment where the stator 1 is a ring-shaped non-split-type stator $1c$ having a thick portion $t_1$ and a thin portion $t_2$, thus producing a difference between the air gaps $l_1$ and $l_2$ between the stator 1 and the rotor 2. FIG. 1 (D) shows an embodiment where the stator 1 is composed of the C-shaped stator segments $1_a$ and $1_b$, which are disposed at different circumferential spatial distances $a_1$ and $a_2$, thus producing a difference between the air gaps $l_1$ and $l_2$. FIGS. 1 (E) and (F) shows embodiments where a magnetic difference of the stator 1 is produced, instead of structurally biasing the rotor. FIG. 1 (E) shows an embodiment where the stator 1 is composed of C-shaped stator segments, while FIG. 1 (F) shows an embodiment where the stator 1 is a ring-shaped stator.

In this way, this invention has such a construction as to prevent noise from generating by biasing the shaft within the bearing in a predetermined direction by shifting the rotor 2 in a predetermined direction with respect to the stator 1.

As described above, this invention makes it possible to provide a miniature motor running extremely quietly without causing rolling noise and wobbling by the conventional type of volume production without increasing the number of parts and manhours.

What is claimed is:

1. A miniature motor comprising: a motor case; a permanent magnet stator supported on an inner surface of said motor case; first and second bearings supported by said motor case; a rotor shaft supported by said first and second bearings; a commutator supported on said rotor shaft; a rotor supported on said rotor shaft; an electrical contact supported by said housing; and, a contact brush connected to said electrical contact and positioned so as to be in electrical contact with said commutator; and magnetic rotor shaft biasing means for urging the rotor shaft in a predetermined direction within the bearings, said rotor shaft biasing means includes a thick C-shaped stator segment at one side of said rotor and a thin C-shaped stator segment at an opposite side from said thick C-shaped stator segment, said rotor being acted on by a magnetic field form said thick C-shaped stator segment so as to urge said rotor in a direction and urge said rotor shaft in a direction within said bearings.

2. A miniature motor comprising: a motor case; a permanent magnet stator supported on an inner surface of said motor case; first and second bearings supported by said motor case; a rotor shaft supported by said first and second bearings; a commutator supported on said rotor shaft; a rotor supported on said rotor shaft; an electrical contact supported by said housing; and, a contact brush connected to said electrical contact and positioned so as to be in electrical contact with said commutator; and magnetic rotor shaft biasing means for urging the rotor shaft in a predetermined direction within the bearings, said rotor shaft biasing means includes a ring-shaped stator having a thick portion and an opposite thin portion, said rotor being acted on by a magnetic field which is greater in intensity near said thick portion of said ring-shaped stator thereby urging said rotor in a direction and urging said rotor shaft in a direction within said bearings.

3. A miniature motor comprising: a motor case; a permanent magnet stator supported on an inner surface of said motor case; first and second bearings supported by said motor case; a rotor shaft supported by said first and second bearings; a commutator supported on said rotor shaft; a rotor supported on said rotor shaft; an electrical contact supported by said housing; and, a contact brush connected to said electrical contact and positioned so as to be in electrical contact with said commutator; and magnetic rotor shaft biasing means for urging the rotor shaft in a predetermined direction within the bearings, said rotor shaft biasing means includes a split-type stator having a first C-type stator segment and a second C-type stator segment, said first C-type stator segment being positioned closer to said rotor than said second C-type segment, said rotor being acted on by a magnetic field which is of greater intensity near said first C-type stator segment thereby urging said rotor in a direction and urging said rotor shaft in a direction within said bearings.

4. A miniature motor comprising: a motor case, a permanent magnet stator supported on an inner surface of said motor case; first and second bearings supported by said motor case; a rotor shaft supported by said first and second bearings; a commutator supported on said rotor shaft; a rotor supported on said rotor shaft; an electrical contact supported by said housing; and, a contact brush connected to said electrical contact and positioned so as to be in electrical contact with said commutator; and magnetic rotor shaft biasing means for urging the rotor shaft in a predetermined direction within the bearings, said rotor shaft biasing means includes a split-type stator having a first C-type stator segment and a second C-type stator segment, said C-type stator segment having a stronger magnetism than said second C-type stator segment, said rotor being acted on by a magnetic field from said first C-type stator segment which is more intense than the magnetic field of said second C-type stator segment thereby urging said rotor in a direction and urging said rotor shaft in a direction within said bearings.

5. A miniature motor comprising: a motor case; a permanent magnet stator supported on an inner surface of said motor case; first and second bearings supported by said motor case; a rotor shaft supported by said first and second bearings; a commutator supported on said rotor shaft; a rotor supported on said rotor shaft; an electrical contact supported by said housing; and, a contact brush connected to said electrical contact and positioned so as to be in electrical contact with said commutator; and magnetic rotor shaft biasing means for urging the rotor shaft in a predetermined direction within bearings, said rotor shaft biasing means includes a ring-shaped stator having a first portion with stronger magnetism than a second portion which is generally opposite from said first portion, said rotor being acted on by a magnetic field from said stator first portion which is more intense than the magnetic field from said stator second portion thereby causing said rotor to be biased in a direction and biasing said rotor shaft in a direction within said bearings.

6. A miniature motor comprising: a motor case; first and second bearings being supported by said motor case; a stator in the form of a permanent magnet positioned within said motor case, a shaft mounted in said bearings for rotation relative to said motor case; a rotor mounted on said rotor shaft for rotation therewith; said rotor being acted on by a magnetic field associated with said permanent magnet; magnetic biasing means for increasing the intensity of the magnetic field for urging said rotor in a direction and urging said rotor shaft within said bearings in a single radial direction as said rotor shaft rotates in said bearings,: said magnetic biasing means includes a split-type stator having a thick C-shaped stator segment and a thin C-shaped stator segment positioned substantially opposite from said thick C-shaped segment, said rotor being acted on by a magnetic field from said thick C-shaped stator segment which is more intense than the magnetic field of said thin C-shaped stator segment so as to urge said rotor in a direction and urge said rotor shaft in a direction within bearings.

7. A miniature motor comprising: a motor case; first and second bearings being supported by said motor case; a stator in the form of a permanent magnet positioned within said motor case; a shaft mounted in said bearings for rotation relative to said motor case; a rotor mounted on said rotor shaft for rotation therewith; said rotor being acted on by a magnetic field associated with said permanent magnet; magnetic biasing means for increasing the intensity of the magnetic field for urging said rotor in a direction and urging said rotor shaft within said bearings in a single radial direction as said rotor shaft rotates in said bearings, said magnetic biasing means includes a ring-shaped stator having a thick portion and a thin portion substantially opposite from said thick portion, said thick portion producing a magnetic field acting on said rotor which is more intense than the magnetic field of said thin portion so as to urge said rotor in a direction and urge said rotor shaft in a direction within said bearings.

8. A miniature motor comprising: a motor case; first and second bearings being supported by said motor case; a stator in the form of a permanent magnet positioned within said motor case; a shaft mounted in said bearings for rotation relative to said motor case; a rotor mounted on said rotor shaft for rotation therewith; said rotor being acted on by a magnetic field associated with said permanent magnet; magnetic biasing means for increasing the intensity of the magnetic field for urging said rotor in a direction and urging said rotor shaft within said bearings in a single radial direction as said rotor shaft rotates in said bearings, said magnetic biasing means includes a split-type stator having a first C-type stator segment and a second C-type stator segment, said first C-type stator segment being positioned closer to said rotor than said second C-type stator segment, said rotor being acted on by a magnetic field from said first C-type stator segment which is more intense than the magnetic field from the second C-type stator segment so as to urge the rotor in a direction and urge the rotor shaft in a direction within said bearings.

9. A miniature motor comprising: a motor case; first and second bearings being supported by said motor case; a stator in the form of a permanent magnet positioned within said motor case; a shaft mounted in said bearings for rotation relative to said motor case; a rotor mounted on said rotor shaft for rotation therewith; said rotor being acted on by a magnetic field associated with said permanent magnet; magnetic biasing means for increasing the intensity of the magnetic field for urging said rotor in a direction and urging said rotor shaft within said bearings in a single radial direction as said rotor shaft rotates in said bearings, said magnetic biasing means includes a split-type stator having a first stator segment with strong magnetism and a second stator segment with weaker magnetism, said rotor being acted on by a magnetic field from said stator segment with strong magnetism which is more intense than the magnetic field of said stator segment with weak magnetism so as to urge said rotor in a direction and urge rotor shaft in a direction within said bearings.

10. A miniature motor comprising: a motor case; first and second bearings being supported by said motor case; a stator in the form of a permanent magnet positioned within said motor case; a shaft mounted in said bearings for rotation relative to said motor case; a rotor mounted on said rotor shaft for rotation therewith; said rotor being acted on by a magnetic field associated with said permanent magnet; magnetic biasing means for increasing the intensity of the magnetic field for urging said rotor in a direction and urging said rotor shaft within said bearings in a single radial direction as said rotor shaft rotates in said bearings, said magnetic biasing means includes a ring-shaped stator having a first portion with strong magnetism and a second portion substantially opposite from said first portion with weak magnetism, said rotor being acted on by a magnetic field from said first portion which is stronger than the magnetic field of said second portion so as to urge said rotor in a direction and urge said rotor shaft in a direction within said bearings.

* * * * *